US011840389B2

(12) United States Patent
Darby

(10) Patent No.: US 11,840,389 B2
(45) Date of Patent: Dec. 12, 2023

(54) BAG SIDE CONNECTOR FOR A BIB PACKAGE

(71) Applicant: CORPLEX PLASTICS UK LTD., Gloucester (GB)

(72) Inventor: Ian Darby, Leicestershire (GB)

(73) Assignee: LB EUROPE LIMITED, London (GB)

( * ) Notice: Subject to any disclaimer, the term of this patent is extended or adjusted under 35 U.S.C. 154(b) by 395 days.

(21) Appl. No.: 17/299,073

(22) PCT Filed: Dec. 5, 2019

(86) PCT No.: PCT/IB2019/060480
§ 371 (c)(1),
(2) Date: Jun. 2, 2021

(87) PCT Pub. No.: WO2020/115699
PCT Pub. Date: Jun. 11, 2020

(65) Prior Publication Data
US 2022/0055816 A1     Feb. 24, 2022

(30) Foreign Application Priority Data
Dec. 7, 2018    (GB) ...................................... 1819979

(51) Int. Cl.
*B65D 77/06*     (2006.01)
*B65D 47/20*     (2006.01)
(Continued)

(52) U.S. Cl.
CPC ....... *B65D 77/067* (2013.01); *B65D 47/2075* (2013.01); *B65D 47/248* (2013.01);
(Continued)

(58) Field of Classification Search
CPC .............. B65D 47/248; B65D 47/2018; B65D 51/1683; B65D 77/06; B65D 77/062;
(Continued)

(56) References Cited

U.S. PATENT DOCUMENTS

| 851,981 | A | * | 4/1907 | Cloos | .................... F16K 17/105 |
| | | | | | 137/506 |
| 2,183,912 | A | * | 12/1939 | Isler | .................. B65D 47/2075 |
| | | | | | 222/506 |

(Continued)

FOREIGN PATENT DOCUMENTS

| CN | 1077654 A | 10/1993 |
| CN | 1187595 A | 7/1998 |

(Continued)

OTHER PUBLICATIONS

International Search Report and Written Opinion corresponding to International Patent Application No. PCT/IB2019/060480, dated Mar. 10, 2020.

*Primary Examiner* — Kevin F Murphy
*Assistant Examiner* — Jonathan J. Waddy
(74) *Attorney, Agent, or Firm* — McAndrews, Held & Malloy, Ltd.

(57) ABSTRACT

The bag side connector for a BIB package comprises: an element (10) having a longitudinal axis (12) and including a flange (14) with an upper and a lower face, wherein a first collar (16) protrudes from the upper face, so that a cylindrical chamber (18) is defined, a second collar (20) protrudes from the lower face, and the flange (14) has at least one through hole (22) in the area delimited by the second collar (20); and an internal valve device including an obturator (24) slidable along said axis (12) and a third collar (26) protruding from the lower face of the flange (14) coaxially and internally in respect of the second collar (20) and externally in respect of the area with at least one through (Continued)

Figure 1:
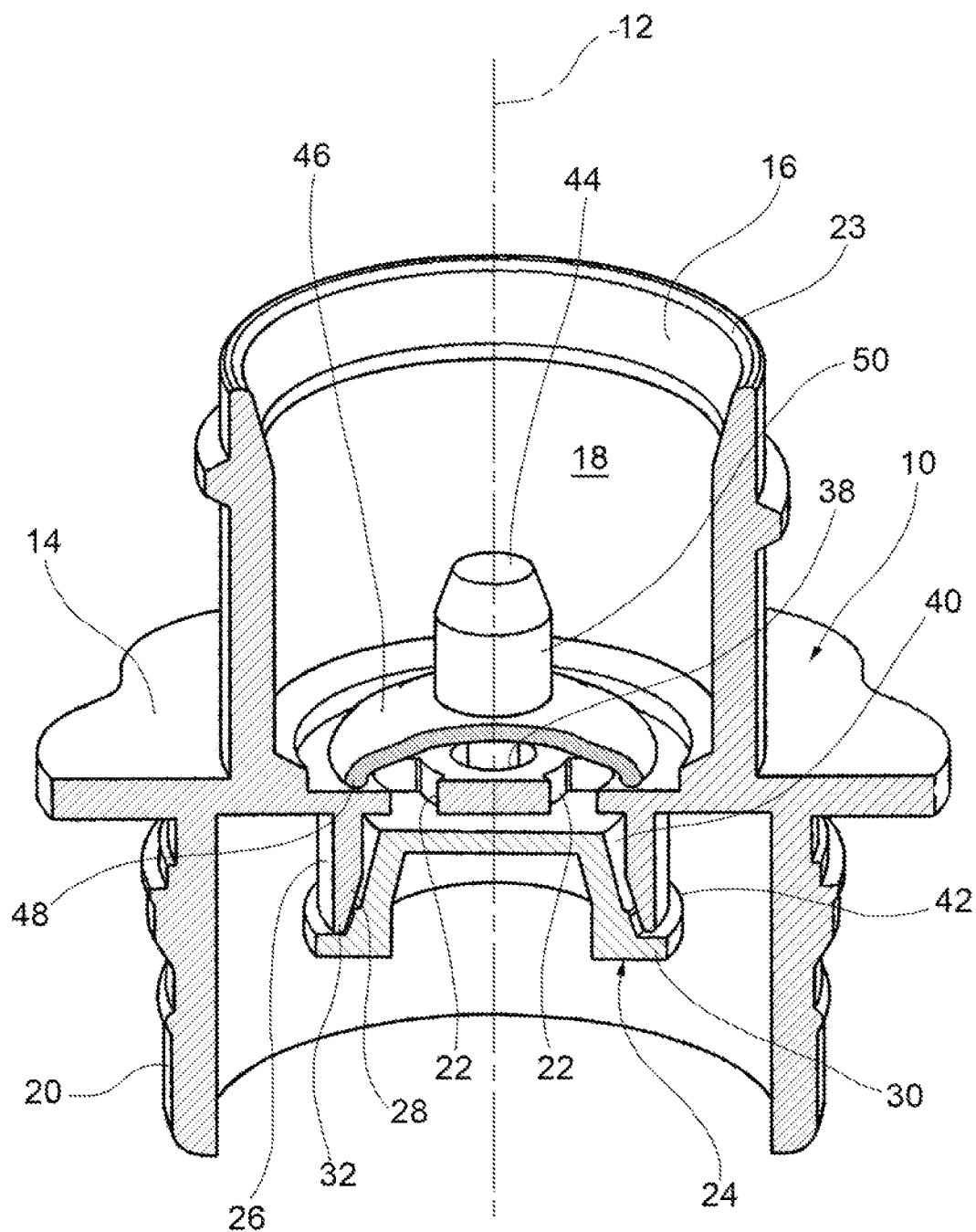

hole (22), wherein said obturator (24) has a foot (30) suitable for contacting a distal edge (32) of the third collar (26) to form a leak-tight seal, and a top wall (34) from which an actuating pin (36) protrudes and extends through a center bore (38) of the flange (14). The connector further comprises an external valve device arranged in the chamber (18) and suitable for allowing/interrupting the fluid communication between the chamber (18) and the at least one (through hole (22) in dependence on the pressure existing in the chamber (18).

9 Claims, 3 Drawing Sheets

(51) Int. Cl.
  *B65D 47/24* (2006.01)
  *F16K 15/18* (2006.01)
  *B67D 1/04* (2006.01)
  *B67D 3/04* (2006.01)
(52) U.S. Cl.
  CPC ........ *F16K 15/1845* (2021.08); *B67D 1/0462* (2013.01); *B67D 3/043* (2013.01)
(58) Field of Classification Search
  CPC .............. B65D 77/065; B65D 47/2075; B65D 77/067; B67D 1/0004; B67D 2001/0827; B67D 1/0462; B67D 3/043; F16K 15/18; F16K 15/1825; F16K 15/184; F16K 15/1845; F16K 15/205; A61M 2039/2466; F16L 37/28; F16L 37/30; F16L 37/38
  USPC ........ 137/613, 614.19, 614.2, 614.21, 512.3, 137/512.5, 513, 526, 860; 222/491, 492, 222/493, 494, 495, 496, 497, 518; 251/902
  See application file for complete search history.

(56) References Cited

U.S. PATENT DOCUMENTS

| | | | | |
|---|---|---|---|---|
| 4,410,108 | A | * 10/1983 | Minard | ................. B65B 39/001 141/261 |
| 5,477,883 | A | 12/1995 | Totten | |
| 5,613,515 | A | * 3/1997 | Huang | ...................... B60S 5/04 137/224 |
| 6,145,712 | A | * 11/2000 | Benoist | ................. B65D 83/44 222/402.1 |
| 6,749,092 | B2 | * 6/2004 | Olechowski | ........... B65D 47/24 222/525 |
| 8,763,638 | B2 | * 7/2014 | Deubler | .................... F17D 1/04 251/30.05 |
| 2002/0005415 | A1 | * 1/2002 | De Laforcade | .... B65D 47/2075 222/481.5 |
| 2012/0111901 | A1 | 5/2012 | Beard | |
| 2013/0306676 | A1 | 11/2013 | Fishel | |
| 2017/0102081 | A1 | * 4/2017 | Liu | ...................... F16K 15/207 |
| 2017/0158485 | A1 | * 6/2017 | Lansberry | ............ B67D 3/0041 |
| 2020/0268191 | A1 | * 8/2020 | Huang | ................. B65D 47/248 |

FOREIGN PATENT DOCUMENTS

| | | |
|---|---|---|
| CN | 1747879 A | 3/2006 |
| CN | 107585428 A1 | 1/2018 |
| DE | 202010002240 U1 | 5/2010 |
| DE | 102009040832 A1 | 3/2011 |
| DE | 102015003506 A1 | 9/2016 |
| DE | 102015010477 A1 | 2/2017 |
| DE | 102015013425 A1 | 4/2017 |
| EP | 2 852 551 | 4/2015 |
| WO | 95/21101 | 8/1995 |
| WO | 2012/152246 A1 | 11/2012 |
| WO | 2013/176922 | 11/2013 |
| WO | 2012/061667 | 5/2015 |

* cited by examiner

BAG SIDE CONNECTOR FOR A BIB PACKAGE

The present invention relates to a bag side connector for a bag-in-box (BIB) package usable for storing and transporting liquids.

A BIB package typically consists of a plastic bag seated inside a box and having a spout provided with a valve for liquid filling and delivery.

A known bag side connector for a BIB package, comprises:
- an element having a longitudinal axis and including a flange with an upper and a lower face, wherein a first collar protrudes from the upper face, so that a cylindrical chamber is defined, a second collar protrudes from the lower face, and the flange has at least one through hole in the area delimited by said second collar, and
- an internal valve device including an obturator slidable along said axis and a third collar protruding from the lower face of the flange coaxially and internally in respect of said second collar and externally in respect of said area with at least one through hole, wherein said obturator has a foot suitable for contacting a distal edge of said third collar to form a leak-tight seal, and a top wall from which an actuating pin protrudes and extends through a center bore of the flange.

A BIB package provided with such bag side connector is usually emptied not at once, but in several successive stages by introducing a so-called "nose" of an emptying line within said chamber, which brings out the opening of the internal valve device and—following vacuum application—the delivery of the liquid.

However, at the end of each emptying stage a fraction of the liquid taken from the bag stagnates in the chamber defined by the upper face of the flange and the first collar, as well as in the emptying line and is thus exposed to bacterial contamination, since it is very difficult to clean this latter line. Hence, the possibly contaminated stagnating liquid can flow back into the bag, wherein the remaining liquid may become a culture medium for these bacteria. Accordingly, the BIB package's lifetime after the first liquid delivery must be sharply limited, in order to avoid that any possibly occurred bacterial contamination grows to unacceptable levels.

One object of the present invention is to provide a bag side connector for a BIB package wherein the above risk of bacterial contamination is prevented.

According to the present invention, this object is achieved by means of a bag side connector for a BIB package having the above disclosed features and characterized in that it further comprises an external valve device arranged in said chamber and suitable for allowing/interrupting the fluid communication between the chamber and said at least one through hole in dependence on the pressure existing in said chamber.

A further subject-matter of the present invention is constituted by a BIB package including such bag side connector.

When the "nose" of an emptying line enters into the chamber of a bag side connector of a BIB package according to the present invention, it initially opens just the internal valve, without any exit of the liquid from the bag. Successively, when vacuum is applied and the external valve opens, the liquid exits from the bag. As soon as the vacuum application terminates, the external valve closes and isolates the bag from the external environment, so that it is avoided that liquid exited from the bag stagnates in the chamber and may flow back into the bag at the next emptying stage. Accordingly, any substantive risk of bacterial contamination should be avoided and the BIB package's lifetime correspondingly extended.

Advantageously, the external valve device is constituted by a single member of thermoplastic elastomer (TPE), to which said obturator is associated.

Typically, the cylindrical chamber has an opening which is coaxial with the longitudinal axis and allows the passage of the "nose" of the emptying line.

The member of TPE may also play the role of the return spring of which the internal valve of the bag side connector is conventionally provided. The bag side connector of this embodiment of the invention is thus highly material efficient and allows a meaningful reduction of the number of components and a simplification of the assembling operation, with a consequent cost reduction.

The bag side connector of the invention has also the advantage of not requiring operation by a specifically skilled operator.

Figure 2:
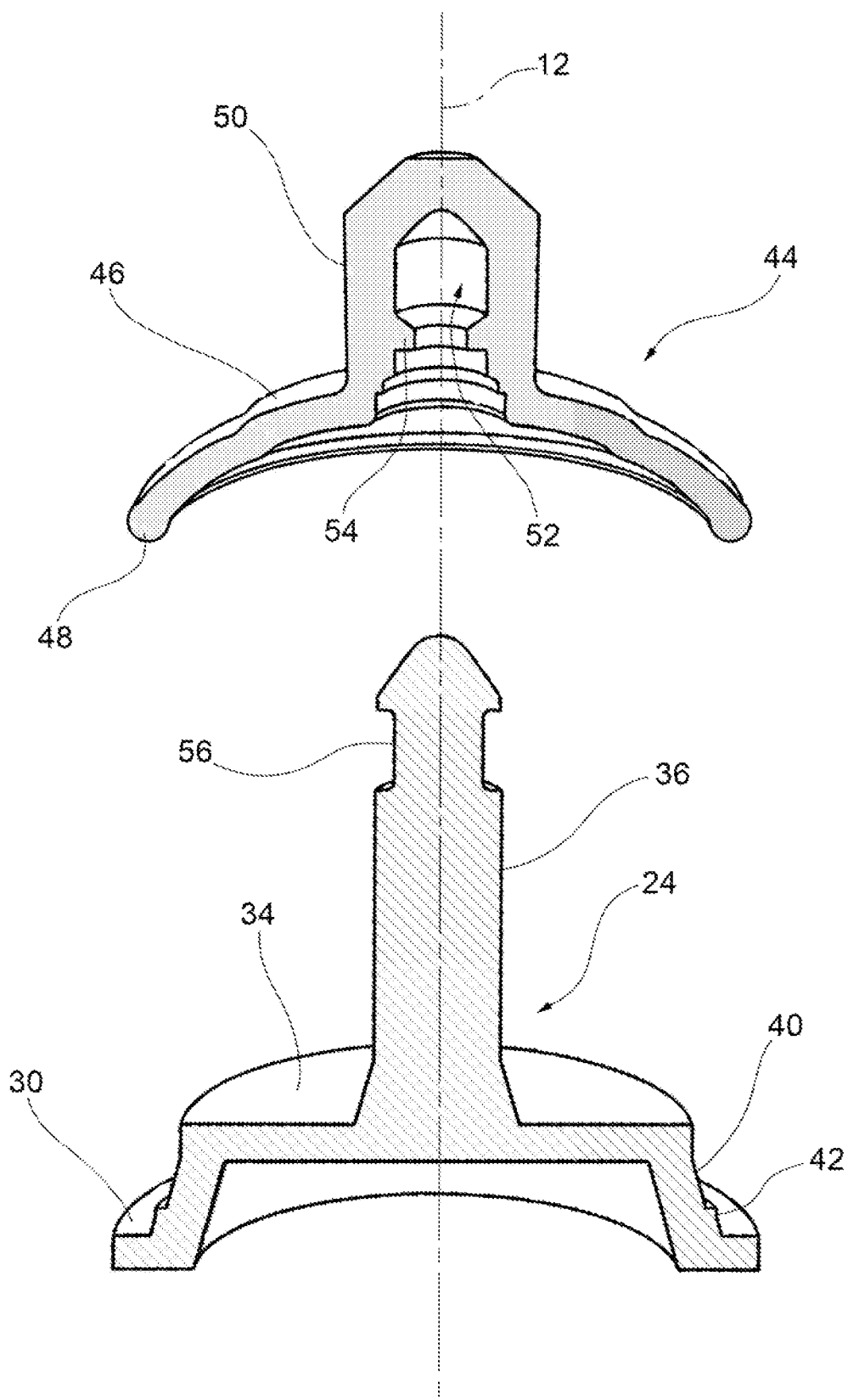

Further advantages and features of the present invention will be apparent from the following detailed description, given by way of non-limiting example with reference to the appended drawings, in which:

FIG. 1 is a perspective broken view of a bag side connector for a BIB package according to the invention, FIG. 2 is a perspective exploded and sectional view of two components of the connector of FIG. 1, and FIGS. 3 to 5 are schematic views of the respective configurations assumed by the bag side connector of FIG. 1 during successive steps of an emptying process of a BIB package provided therewith.

A bag side connector for a BIB package, comprises (FIG. 1) an element 10 having a longitudinal axis 12 and including a flange 14 with an upper and a lower face. A first collar 16 protrudes from the upper face of the flange 14, so that a cylindrical chamber 18 is defined by the upper face of the flange 14 and the first collar 16, whereas a second collar 20 protrudes from the lower face of the flange 14. Furthermore, a center area of the flange 14 has a plurality of through holes 22 circumferentially arranged around the longitudinal axis 12. The chamber 18 has a circular external opening 23 which is coaxial with the axis 12.

The bag side connector also comprises an internal valve device including an obturator 24 slidable along the longitudinal axis 12 and a third collar 26 protruding from the lower face of the flange 14 coaxially and internally in respect of the second collar 20 and externally in respect the center area with the through holes 22 of the flange 14. The distal portion 28 of the third collar 26 is tapering.

The obturator 24 has a circumferential foot 30 suitable for contacting a circumferential distal edge 32 of the third collar 26 to form a leak-tight seal, and a top wall 34 from which an actuating pin 36 protrudes and extends through a center bore 38 of the flange 14. The obturator 24 also has a side wall 40 which raises from said foot 30 and has a frusto-conical shape with an intermediate step 42.

The bag side connector comprises an external valve device constituted by a single member 44 of thermoplastic elastomer (TPE) material, which is arranged within the cylindrical chamber 18 on the upper face of the flange 14 and is suitable for allowing/interrupting the fluid communication between the chamber 18 and the through holes 22 in dependence on the pressure existing in the chamber 18.

The member 44 has a cup-shaped basis 46 with a peripheral lip 48 enclosing the center area of the flange 14 with the through holes 22 and an upwards convexity. A hollow upper stem 50 protrudes upwards from the center of the cup-shaped basis 46. The stem 50 has an internal cavity 52 with an opening downwards, within which the upper portion of the pin 36 is housed. The pin 36 (FIG. 2) having a tapering top is fixed within the cavity 52 of the stem 50 through a circumferential relief 54 protruding from the internal wall of the cavity 52 and inserted into a circumferential side groove 56 of the pin 36.

Generally, the bag side connector is fully symmetrical in respect of the longitudinal axis 12.

An emptying process of a BIB package provided of a bag side connector having the above features proceeds as follows.

Figure 3:
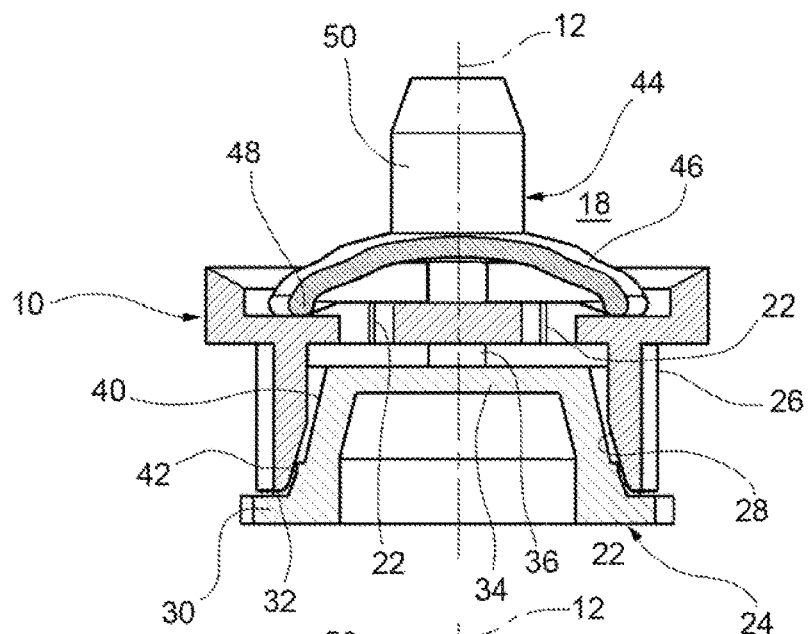
Figure 4:
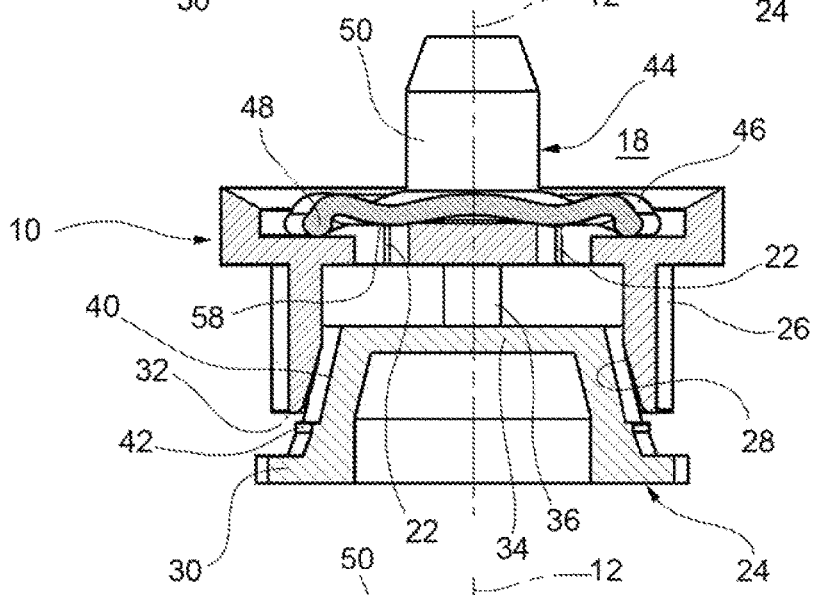
Figure 5:
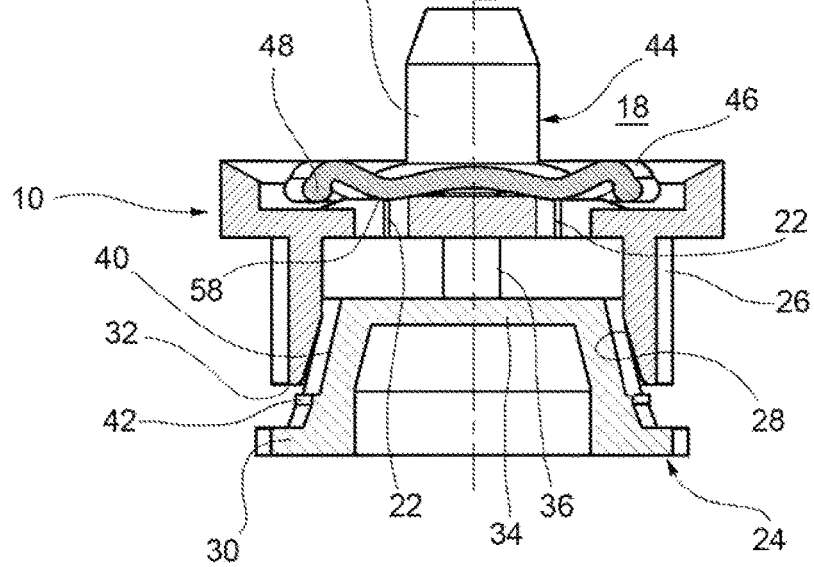

FIG. 3 illustrates the configuration of the connector in the normal storing and transporting configuration in which the foot 30 of the obturator 24 contacts the lower edge 32 of the third collar 26 and forms a leak-tight seal and the peripheral lip 48 of the member 44 is in contact with the upper face of the flange 14 and encloses the center area thereof with the through holes 22.

Accordingly, both the internal and external valves are closed and the content of the bag is doubly isolated from the external environment.

Successively, when the "nose" of a conventional emptying line (not shown in the figures for clarity' sake) enters through the opening 23 into the cylindrical chamber 18 coaxially with the axis 12 (FIG. 4), it presses the flat top of the stem 50 and brings about the translation of this latter towards the flange 14, and the translation downwards of the obturator 24 due to the fixing of the pin 36 within the cavity 52 of the stem 50, as well as the flattening of the basis 46 due to the elasticity properties of the TPE material constituting the member 44. The translation movement of the obturator 24 is rendered easier by the corresponding profiles of the side wall 40 thereof and the tapering distal portion 28 of the third collar 26 and brings about the detachment of the distal edge 32 of the third collar 26 from the foot 30.

The internal valve is thus opened, but the liquid in the bag is still isolated from the external environment by the external valve which remains closed due to the contact still existing between the upper face of the flange 14 and the lip 48, as well as an intermediate circumferential region 58 of the flattened basis 46.

Then (FIG. 5), vacuum is applied in the emptying line and the external valve opens, because the pressure drop in the chamber 18 brings about the raising of the peripheral lip 48 from the upper face of the flange 14, whose through holes 22 are isolated from the chamber 18 not even by the intermediate circumferential region 58 of the basis 46 which is turned upwards. Accordingly, the liquid within the bag is drawn by the vacuum and the bag is partially emptied through the opening 23 of the chamber 18. Hence, the general flow direction of the liquid is parallel to the longitudinal axis 12.

As soon as the vacuum application terminates, the external valve closes and isolates the liquid remaining in the bag from the external environment. It is thus avoided that any liquid exited from the bag stagnates in the chamber 18 and may flow back into the bag at the next emptying stage, posing a risk of bacterial contamination of the liquid content.

Naturally, the principles of the invention remaining the same, the details of construction and embodiments may be widely varied with respect to those described purely by way of example, without thereby departing from the claimed scope.

The invention claimed is:

1. A bag side connector for a bag-in-box package, comprising:
    an element having a longitudinal axis and including a flange with an upper and a lower face, wherein a first collar protrudes from the upper face, so that a cylindrical chamber is defined, a second collar protrudes from the lower face, and the flange has at least one through hole in an area delimited by said second collar, and
    an internal valve device including an obturator slidable along said axis and a third collar protruding from the lower face of the flange coaxially and internally in respect of said second collar and externally in respect of said area with at least one through hole, wherein said obturator has a foot suitable for contacting a distal edge of said third collar to form a leak-tight seal, and a top wall from which an actuating pin protrudes and extends through a center bore of the flange,
    said connector being characterized in that it further comprises an external valve device arranged in said chamber and suitable for allowing/interrupting the fluid communication between the chamber and said at least one through hole in dependence on the pressure existing in said chamber.

2. A bag side connector according to claim 1, wherein said external valve device is constituted by a single member of thermoplastic elastomer, to which said obturator is associated.

3. A bag side connector according to claim 2, wherein said single member of thermoplastic elastomer is arranged on the upper surface of the flange within said chamber, and has a cup-shaped basis with a peripheral lip enclosing said area of the flange with said at least one through hole and an upwards convexity, and an upper stem which protrudes upwards from the center of said cup-shaped basis and has an internal cavity within which an upper portion of said pin is housed.

4. A bag side connector according to claim 3, wherein said pin is fixed within the cavity of the stem through a circumferential relief protruding from the internal wall of said cavity and inserted into a circumferential side groove of the pin.

5. A bag side connector according to claim 1, wherein said area of the flange delimited by the second collar has a plurality of through holes circumferentially arranged around said longitudinal axis.

6. A bag side connector according to claim 1, wherein said obturator has a side wall that raises from said foot and has a frusto-conical shape with an intermediate step.

7. A bag side connector according to claim 1, wherein the distal portion of said third collar is tapering.

8. A bag side connector according to claim 1, wherein said cylindrical chamber has an opening which is coaxial with the longitudinal axis.

9. A bag-in-box package including a bag side connector having the features disclosed in claim 1.

\* \* \* \* \*